3,047,542
POLYAMIDE RESINS

John L. Lang, Midland, Mich., assignor to The Dow Chemical Company, Midland, Mich., a corporation of Delaware
No Drawing. Filed May 1, 1959, Ser. No. 810,208
11 Claims. (Cl. 260—78)

This invention relates to polyamide resins obtainable by the condensation of aliphatic halo-acids with diamines wherein each amino group bears at least one hydrogen atom and to methods for the preparation of such resins.

The resins may be made by heating an equimolecular mixture of a diamine having primary or secondary amino groups with an aliphatic mono-halo-monocarboxylic acid free of other groups, such as carbonyl, which are reactive with amino groups. The two reactants first combine to form a salt which, upon being heated to about 150–300° C. forms the polyamide resin. These reactions may be illustrated schematically as follows:

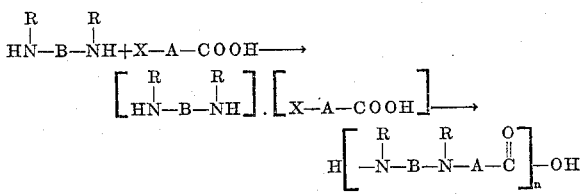

wherein each R is hydrogen or lower alkyl or the two R's of the diamine are joined to form with —N—B—N— a six-membered ring, B is an alkylene radical containing 2 to about 6 carbon atoms, A is an alkylene radical containing one to about 4 carbon atoms and $n$ is an integer corresponding to the degree of polymerization of the polyamide.

Conveniently, the diamine and the halo-acid are separately dissolved in a suitable solvent, such as water or a lower alkanol, the two solutions are mixed and the solvent is evaporated, thus forming the salt. The latter, upon being heated at a higher temperature of the order of about 150–300° C., loses water and HX to form the polyamide resin.

Suitable diamines are those having at least one, and preferably only one, hydrogen atom on each nitrogen atom, such as piperazine, ethylenediamine, 1,2- and 1,3-propylenediamine, 1,2-, 1,3-, 1,4- and 2,3-butylenediamine, hexamethylenediamine and the N-alkyl and N,N'-dialkyl derivatives of the above alkylenediamines, especially the N-methyl- and N,N'-dimethylalkylenediamines.

Suitable halo-acids are the saturated aliphatic monohalo mono-carboxylic acids wherein the halogen is chlorine, bromine or iodine. The fluoro-acids are too inert to form polymers while the iodo-acids are too expensive; hence, the preferred acids are the chloro- and bromo-acids. The length of the carbon chain of the acid is unimportant insofar as reactivity is concerned though the properties of the polymers are considerably affected thereby. Thus, those derived from halo-acetic acid are harder and more rigid than those derived from omega-halo-valeric acid and the like. The position of the halogen on the carbon chain of the acid affects the reactivity somewhat, in addition to the properties of the polymer. Thus, the alpha-halo-acids are more reactive than those in which the halogen is more remote from the carboxyl group. Also, the alpha-halo-acids form harder, more rigid polymers than do those in which the halogen is farther removed from the carboxyl group.

As in any production of polymers by the condensation of two dissimilar monomeric units, the production of resins having high molecular weight is favored by using the two monomers in exactly the stoichiometric proportion (here 1:1). This is conveniently done in the preferred procedure by mixing the aqueous solutions of the diamine and the halo-acid in approximately equimolecular quantities and then crystallizing the resulting salt from the solution, as by concentrating the solution, cooling it, or both. The crystalline salt can then be used as the one-component reactant for making the polymer, it being sufficient to heat it to effect the condensation.

The practice of the invention is illustrated by the following examples.

Example 1.—Reaction of Chloroacetic Acid With Piperazine (1) 4.725 g. (0.05 mole) of chloroacetic acid was dissolved in 100 g. of benzene, and 9.712 g. (0.05 mole) of hexahydrate was added slowly, with stirring. After the addition was completed, the solution was heated on the steam bath until the volume was about 25 ml. and cooled. A syrup resulted, which could not be induced to crystallize. Upon heating strongly, a light yellow resinous material formed, which could be drawn into fibers or cast as a film on a sheet of glass or aluminum.

(2) 4.7 g. (0.05 mole) of chloroacetic acid was dissolved in methanol, and 9.7 g. (0.05 mole) of piperazine hydrate was added. After crystallization, a product melting at 131–134° C. was obtained. By heating at about 150–300° C. this could be converted to a resin similar to that in (1) above.

Example 2.—Reaction of Bromoacetic Acid With Piperazine (1) 6.948 g. (0.05 mole) of bromoacetic acid was dissolved in 100 ml. of de-ionized water, and 9.7 g. (0.05 mole) of piperazine hydrate was added slowly, with stirring. The salt so formed was heated, and thereby polymerized to a resinous material, which upon further heating, split out HBr and became very dark in color. The initially formed resin was self-extinguishing and could be formed into films and fibers.

(2) 6.95 g. (0.05 mole) of bromoacetic acid was dissolved in 100 ml. of methanol, and 9.7 g. (0.05 mole) of piperazine hydrate added. The salt was crystallized, and had a melting point of 229–231° C., condensing rapidly at this temperature to give a resinous material similar to that of the above examples.

Example 3.—Reaction of Trans-2,5-Dimethylpiperazine With Chloroacetic Acid (1) 5.7 g. (0.05 mole) of trans-2,5-dimethylpiperazine was dissolved in a solution of 4.7 g. (0.05 mole) of chloroacetic acid in 100 ml. of de-ionized water. Upon heating the resulting crystalline solid, a light yellow polymer formed, which could be drawn into fibers. This polymer seemed more tractable than the corresponding one from piperazine.

(2) 5.7 g. (0.05 mole) of trans-2,5-dimethylpiperazine was dissolved in 100 ml. of methanol, and 4.7 g. (0.05 mole) of chloroacetic acid added with stirring. The salt was crystallized from the solution, and had a melting point of 171–171.5° C. When heated above its melting point it condensed to a resin similar to that of (1) above.

Example 4.—Reaction of Hexamethylenediamine With Chloroacetic Acid (1) 9.45 g. (0.1 mole) of chloroacetic acid was dissolved in 100 ml. of acetone. 16.11 g. (0.1 mole) of 72 percent hexamethylenediamine was added, and the material heated on the steam bath. Total solution did not take place, so 5 ml. of de-ionized water was added to effect solution. Upon further heating on the steam bath, the reaction mixture separated into two phases. The acetone layer did not contain an appreciable amount of the product. The water layer refused to crystallize, even on cooling with Dry Ice. When heated to dryness on the hot plate, the water layer residue was polymerized, which polymer could be drawn into fibers.

(2) 9.45 g. (0.1 mole) of chloroacetic acid was dissolved in 200 ml. of methanol, and 16.11 g. (0.1 mole) of 72 percent hexamethylenediamine was added. Again crystallization was difficult, the product being a syrup. The product was precipitated by the addition of benzene, and crystals collected, M.P., 149–151° C., condensing to a resin when the temperature reached 157° C.

*Example 5.—Reaction of Ethylenediamine With Chloroacetic Acid*

(1) 9.45 g. (0.1 mole) of chloroacetic acid was dissolved in 100 ml. of acetone and 6.3 g. (0.1 mole) of 95 percent ethylenediamine added. A vigorous reaction took place. The acetone was evaporated on the steam bath, but no crystallization took place. Upon heating the material on the hot plate, resinification took place.

(2) 9.45 g. (0.1 mole) of chloroacetic acid was dissolved in methanol, and 7.77 g. (0.1 mole) of 77.3 percent ethylenediamine was added. The solution was heated on the steam bath, but no crystallization occurred on cooling, and the product was precipitated out of solution with benzene. The melting point was 227–230° C. At 240° C. it condensed to a resin similar to that of (1) above.

(3) 9.45 g. (0.1 mole) of chloroacetic acid was dissolved in 200 ml. benzene and 7.77 g. (0.1 mole) of 77.3 percent ethylenediamine added. Upon evaporation, a syrup resulted. No crystals were obtained, but the syrup could be converted by heat to a resin similar to those of (1) and (2) above.

(4) 9.45 g. (0.1 mole) of chloroacetic acid was dissolved in 100 ml. of de-ionized water, and 7.77 g. (0.1 mole) of 77.3 percent ethylenediamine added. Upon evaporation, a syrup again resulted, which gave a linear polymer when heated.

(5) 9.45 g. (0.1 mole) of chloroacetic acid was dissolved in 100 ml. of methanol and 6.3 g. (0.1 mole) of 95 percent ethylenediamine added, and the solvent allowed to evaporate at room temperature. The crystalline product condensed at 237–242° C. to form a thermoset resin.

In the reactions with ethylenediamine, in all cases where crystals were isolated, cross-linking occurred upon resinification.

*Example 6.—Reaction of 2-Chloropropionic Acid With Ethylenediamine*

(1) 10.85 g. (0.1 mole) of 2-chloropropionic acid was dissolved in 100 ml. methanol and 6.3 g. (0.1 mole) of 95 percent ethylenediamine added. The mixture was heated on the steam bath until crystallization began, and cooled. The crystals were easily separated from the reaction mixture, in contrast, the difficulty encountered with the corresponding product from chloroacetic acid, and had a melting point of 179–181° C., and condensed at 193° C. to form a resin.

I claim:

1. A polyamide resin the repeating unit of which has the formula

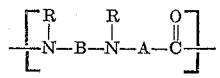

wherein the two R-radicals are selected from the group consisting of H, lower alkyl and an alkylene group consisting of the two R's joined together, thus forming with the group —N—B—N— a six-membered ring, B represents an alkylene radical containing 2 to about 6 carbon atoms and A represents an alkylene radical containing 1 to about 4 carbon atoms.

2. A resin as defined in claim 1 wherein A represents a methylene radical.

3. A resin as defined in claim 1 wherein each R represents a hydrogen radical.

4. A resin as defined in claim 1 wherein B represents a hexamethylene radical.

5. A polyamide resin the repeating unit of which has the formula

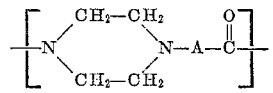

wherein A represents an alkylene radical containing 1 to about 4 carbon atoms.

6. A process for making a polyamide resin comprising reacting by contacting (1) a diamine having the formula

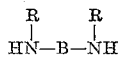

wherein B is an alkylene group containing 2 to about 6 carbon atoms and the two R-radicals are selected from the group consisting of H, lower alkyl and an alkylene radical consisting of the two R's joined together, thus forming with the group —N—B—N— a six-membered ring and (2) a halo-acid having the formula

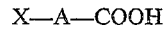

wherein X represents a halogen of atomic number 17 to 53, inclusive, and A represents an alkylene radical containing 1 to about 4 carbon atoms, thus to form the amine salt of the acid, and then heating said salt to about 150–300° C. thus to condense said salt to a polyamide resin.

7. A process as defined in claim 6 wherein the amine is piperazine.

8. A process as defined in claim 6 wherein the amine is ethylenediamine.

9. A process as defined in claim 6 wherein the amine is hexamethylenediamine.

10. A process as defined in claim 6 wherein the acid is chloroacetic acid.

11. A process as defined in claim 6 wherein the acid is alpha-chloropropionic acid.

References Cited in the file of this patent
UNITED STATES PATENTS
2,274,831    Hill _____ Mar. 3, 1942

UNITED STATES PATENT OFFICE

CERTIFICATE OF CORRECTION

Patent No. 3,047,542                                          July 31, 1962

John L. Lang

It is hereby certified that error appears in the above numbered patent requiring correction and that the said Letters Patent should read as corrected below.

Column 2, line 15, after "of", second occurrence, insert -- piperazine --.

Signed and sealed this 8th day of January 1963.

(SEAL)
Attest:

ERNEST W. SWIDER                                         DAVID L. LADD
Attesting Officer                                           Commissioner of Patents